United States Patent [19]

Itani et al.

[11] Patent Number: 4,613,795
[45] Date of Patent: Sep. 23, 1986

[54] DRIVER CIRCUIT CONTROLLER FOR AC TO AC CONVERTERS

[75] Inventors: Abdallah M. Itani, Ballston Spa; Victor D. Roberts, Burnt Hills, both of N.Y.

[73] Assignee: General Electric Company, Schenectady, N.Y.

[21] Appl. No.: 748,076

[22] Filed: Jun. 24, 1985

[51] Int. Cl.$^4$ .............................................. H05B 37/00
[52] U.S. Cl. .................................... 315/205; 315/208; 315/224; 315/226; 315/DIG. 7; 363/37
[58] Field of Search .................. 363/37; 315/DIG. 7, 315/224, 226, 205, 208

[56] References Cited

U.S. PATENT DOCUMENTS

| | | | |
|---|---|---|---|
| 3,360,710 | 12/1967 | Barthold | 363/37 |
| 3,896,336 | 7/1975 | Schreiner et al. | 315/226 |
| 4,170,747 | 10/1979 | Holmes | 315/307 |
| 4,330,817 | 5/1982 | Avar et al. | 363/37 |

OTHER PUBLICATIONS

U.S. Patent Application Ser. No. 562,919, to Flugan, filed Dec. 19, 1983.

Primary Examiner—Harold Dixon
Attorney, Agent, or Firm—Marvin Snyder; James C. Davis, Jr.

[57] ABSTRACT

The switches of an AC to AC converter are switched synchronously with the AC supply voltage. EMI conducted to the AC power line is greatly reduced since the rectifier diodes are off at the time of switching, thus avoiding undesirable effects on nearby electrical apparatus. The converter is useful in a ballast for a discharge lamp.

10 Claims, 3 Drawing Figures

DRIVER CIRCUIT CONTROLLER FOR AC TO AC CONVERTERS

The present invention relates in general to a method and apparatus for providing switching signals to the driver circuits of an AC to AC converter and more specifically to supplying power to an arc discharge lamp such that switching occurs when the dc bus voltage is at a maximum and electromagnetic interference produced is minimized.

BACKGROUND OF THE INVENTION

AC to AC converters are known in the art for a variety of applications. Typically, an AC supply voltage is rectified and the DC voltage is converted to a variable frequency AC voltage by a converter. The switching action of the power switches in the converter bridge results in a certain amount of electromagnetic interference (EMI) propagating in the circuit. The amount of EMI appearing on the AC supply line must be limited in order to avoid adverse effects on other electrical apparatus.

The invention described in U.S. patent application Ser. No. 748,077, filed concurrently herewith and of common assignment, teaches that it is desirable to operate some types of arc discharge lamp from a full-bridge AC converter. When an arc lamp is operated on an AC voltage, the arc must be reignited during each reversal of lamp voltage. During the time that the arc is extinguished the lamp discharge medium deionizes slightly, thus raising the voltage which will reignite the arc. Therefore, the direction of the converter output should be switched when the voltage applied to the arc lamp will be at a maximum, which occurs when the DC voltage is at its maximum.

As demonstrated in U.S. patent application Ser. No. 562,919, filed Dec. 19, 1983, now U.S. Pat. No. 4,567,404 issued July 28, 1986, and assigned to General Electric Company, the high frequency voltage signals of a starting oscillator in a discharge lamp ballast may be restricted to the ballast by selectively inhibiting the oscillator when the diodes of the diode rectifier supplying DC power to the lamp are on.

OBJECTS OF THE INVENTION

It is a principal object of the invention to provide a method and apparatus for switching an AC to AC converter which causes very little EMI to be conducted to the AC supply line.

It is a principal object of the present invention to provide a method and apparatus for switching an AC to AC converter, the switching occurring when the voltage across the converter switches is at a maximum.

It is another object of the invention to provide a driver circuit controller for an AC to AC converter supplying an arc discharge lamp.

SUMMARY OF THE INVENTION

These and other objects are achieved by a method for controlling the switches of an AC to AC converter synchronously with the AC supply. The method is practiced with a converter which includes a diode rectifier, a capacitor and a plurality of switches arranged to be turned on and off in a manner to supply AC power to a load. The method comprises the steps of determining when the diodes in the diode rectifier are nonconductive or off, and inverting first and second complementary control signals for controlling the switches, the inverting step being executed upon determining that the diodes are off.

The invention is also embodied in an apparatus adapted to provide control signals to the driver circuits of an AC to AC converter which are synchronized with the AC supply voltage. The converter includes a diode rectifier, a capacitor, a plurality of switches arranged to supply AC power to a load, and at least two driver circuits for controlling the switches. The apparatus comprises a comparator and a flip-flop. The noninverting input of the comparator is adapted to be coupled to the output of the rectifier and the inverting input of the comparator is adapted to be coupled to the input of the rectifier. The flip-flop has an input coupled to the output of the comparator such that the flip-flop outputs are inverted when the comparator output signal indicates that the diodes in the rectifier have turned off.

BRIEF DESCRIPTION OF THE DRAWINGS

The novel features of the invention are set forth with particularity in the appended claims. The invention itself, however, as to organization and method of operation, together with further objects and advantages thereof, may best be understood by reference to the following description taken in conjunction with the accompanying drawings in which:

DETAILED DESCRIPTION OF THE INVENTION

Figure 1:
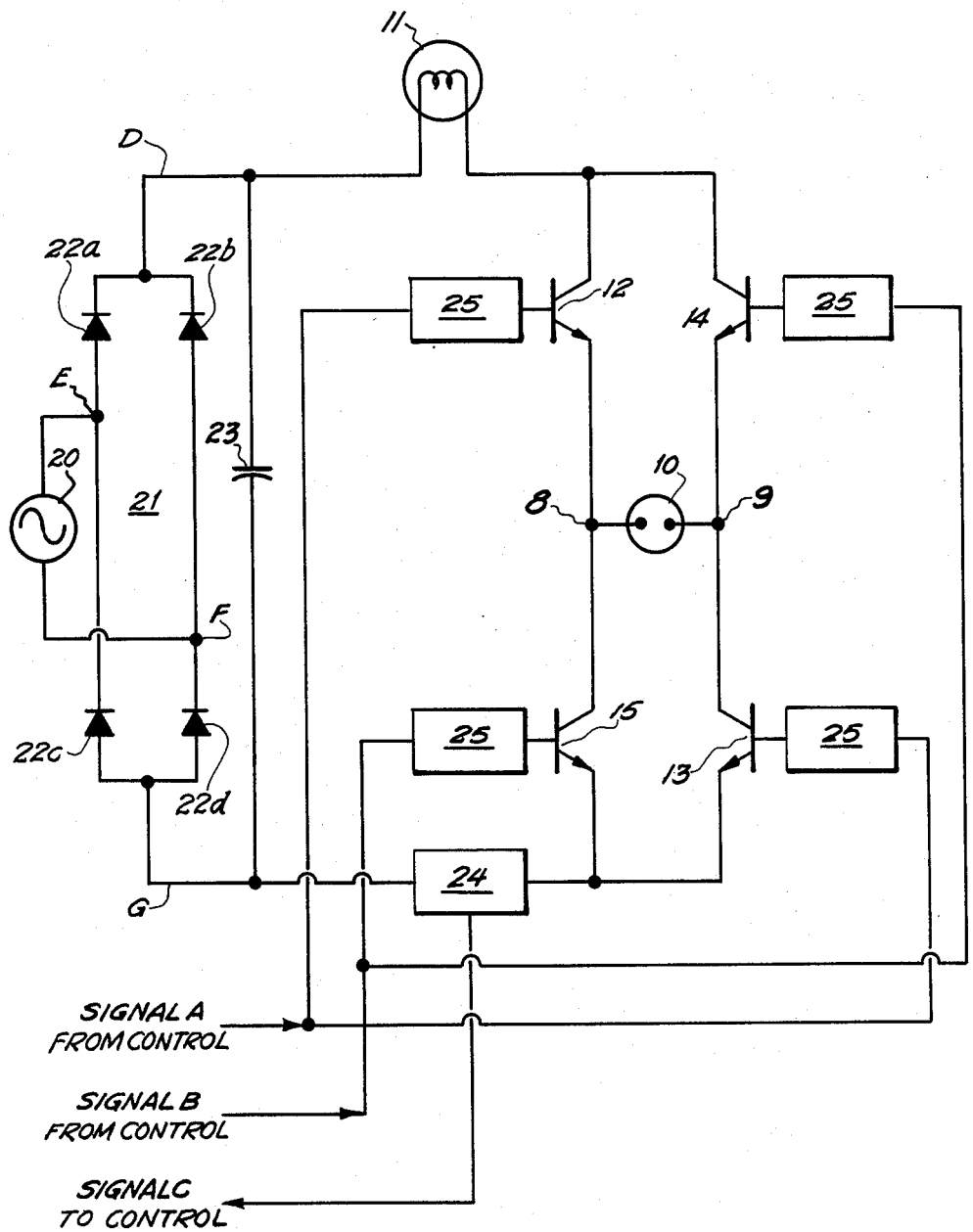
FIG. 1 is a schematic diagram of an AC to AC converter connected to an arc discharge lamp.

Referring to FIG. 1, an arc discharge lamp 10 is connected across the output terminals 8 and 9 of a converter including switches 12-15 shown as bipolar transistors although other devices such as field-effect transistors (FETs) or insulated gate transistors (IGTs) may also be used. Power is supplied to the circuit by an AC supply 20. The AC voltage is full-wave rectified by diode bridge rectifier 21 including diodes 22a-22d and is filtered by filter capacitor 23. Thus, the AC voltage between points E and F is converted to a DC voltage across points D and G. An incandescent filament 11 provides resistive current limiting, i.e. filament 11 of FIG. 1 comprises a resistive ballast. Although a full-bridge converter is shown in FIG. 1, it is also possible to employ other configurations, e.g. a half-bridge.

When switches 12 and 13 are conductive or on and switches 14 and 15 are nonconductive or off (i.e. the converter is in one phase), current flows in one direction through arc lamp 10. When switches 12 and 13 are off and switches 14 and 15 are on (i.e. the converter is in the other phase), current in lamp 10 flows in the opposite direction. Driver circuits 25 each receive a control signal from a control (not shown) and turn each switch 12-15 on or off in response to the control signals. Each driver circuit may comprise a Darlington amplifier as known in the art and each pair of switches may be provided with a single driver circuit. A signal A from the control is provided for controlling switches 12 and 13 and a signal B controls switches 14 and 15.

As previously noted, it is desirable to switch the direction of current through arc lamp 10 when diodes 22a-22d are turned off. Generation of EMI produced by switching at this time is substantially restricted to the ballast since it is isolated from the AC supply line by the nonconducting diodes. Therefore, control signals A and B are to be inverted each time diodes 22a–22d switch off so that the conducting states of switches 12–15 are changed while diodes 22a–22d are off, and arc lamp 10 is operated synchronously with (i.e. at the same frequency as) AC supply 20.

If desired, control signals A and B may also be adapted to assist in starting arc lamp 10. For example, when the circuit is first turned on, switches 12–15 may provide current in only one direction (i.e. the converter is locked in one phase) until an arc is established in arc lamp 10. Further provisions for starting arc lamp 10 are the subject of above-mentioned application Ser. No. 748,077. In those lamps which have a preferred cathode, the starting current must have the proper polarity. A current sensor 24 is provided which may comprise a transformer or a current sensing resistor. Current sensor 24 provides a signal C, representing the load current amplitude, to the control.

It may also be desirable to introduce a dwell time between opposite switching intervals in order to ensure that switches in the same leg of the bride are not on at the same time. This can be accomplished by setting control signals A and B to turn off switches 12–15 during the dwell period.

Figure 2:
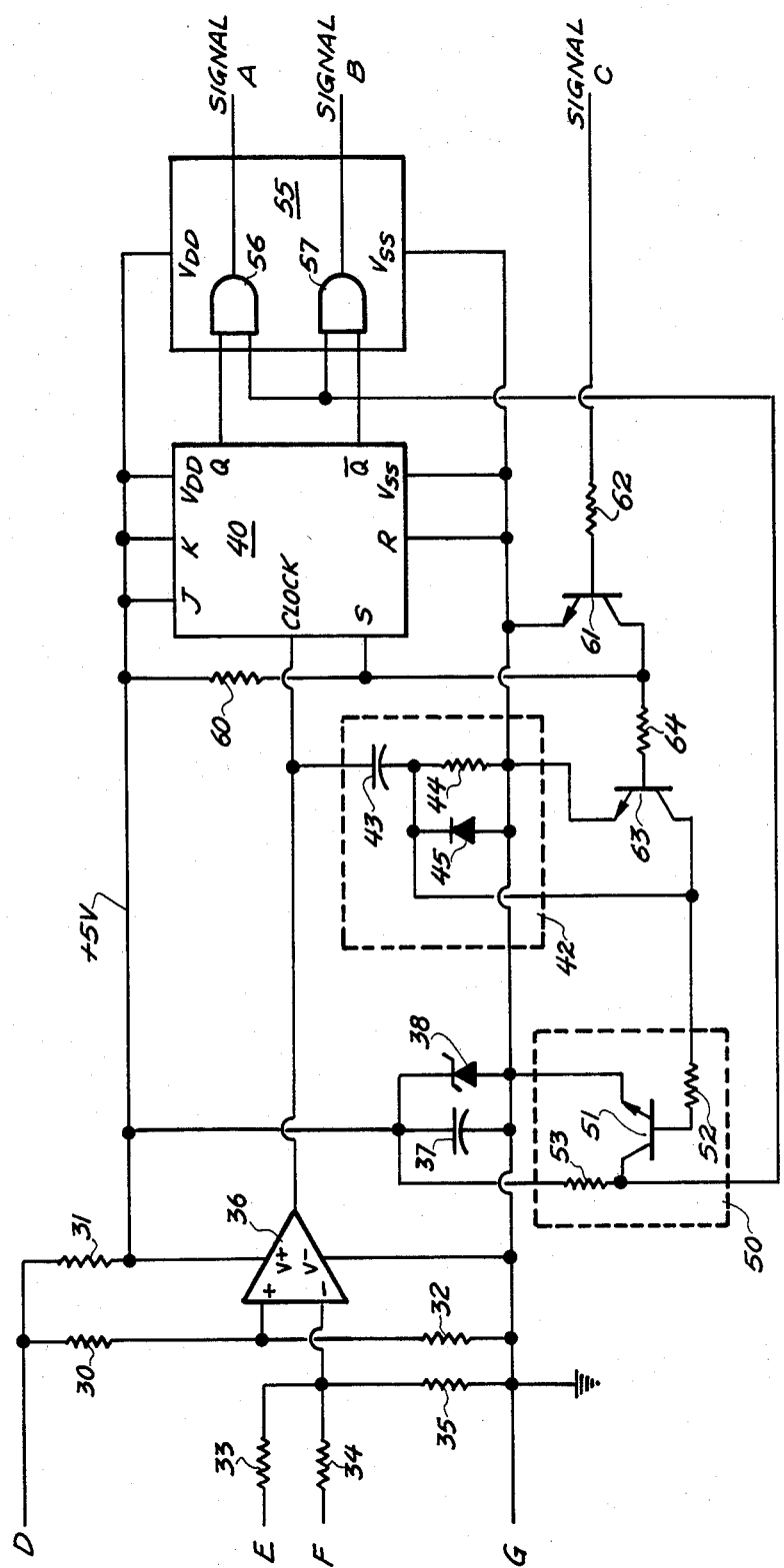
FIG. 2 is a schematic diagram of the driver circuit controller of the present invention.

Referring now to FIG. 2, the control circuit for generating control signals A and B will now be described. A comparator 36 senses the voltage across the diodes of diode rectifier 21, shown in FIG. 1. Comparator 36 may comprise, for example, operational amplifier CA3130 manufactured by RCA Corporation. The noninverting input is connected to point D of FIG. 1 through a resistor 30 and to point G of FIG. 1 through a resistor 32. The inverting input is connected to point E through resistor 33, point F through resistor 34, and point G through resistor 35. A resistor 31, a capacitor 37 and a 5 volt zener diode 38 are connected between points D and G to provide a +5 volt DC bus.

The output of comparator 36 is connected to the CLOCK input of a JK flip-flop 40, which may for example comprise an integrated circuit CD4027A available from RCA. The set input S of flip-flop 40 is coupled to the +5 V bus through a resistor 60. The J, K and $V_{DD}$ inputs are connected to +5 V and the R and $V_{SS}$ inputs are connected to ground. The Q output of flip-flop 40 is connected to one input of an AND gate 56 in logic means 55 while the $\overline{Q}$ output is connected to AND gate 57 in logic means 55.

Pulse generating means 42 includes a capacitor 43 and a resistor 44 connected in series between the output of comparator 36 and ground (i.e. point G). A diode 45 is connected across resistor 44 so that its anode is connected to ground. The cathode of diode 45 is connected to a resistor 52 in inverting means 50. The other end of resistor 52 is connected to the base of a transistor 51. The emitter of transistor 51 is connected to ground and the collector is coupled to +5 V through a resistor 53. The junction between resistor 53 and the collector of transistor 51 is connected to the other inputs of AND gates 56 and 57. The outputs of AND gates 56 and 67 provide control signals A and B, respectively.

Signal C from current sensor 24 (FIG. 1) is coupled to the base of a transistor 61 through a resistor 62. The emitter of transistor 61 is connected to ground and the collector is connected to the S input of flip-flop 40. The base of a transistor 63 is coupled to the collector of transistor 61 through a resistor 64. The emitter of transistor 63 is connected to ground and the collector is connected to resistor 52 of inverting means 50.

In operation, the output signal of comparator 36 is zero whenever diodes 22a–22d of FIG. 1 are on, since the voltage at either point E or F is higher than at point D (i.e. the diodes are forward biased). When diodes 22a–22d turn off, the voltage at point D will be higher than either point E or point F and the output signal of comparator 36 rises to a positive value, e.g. +5 volts. The output signal of comparator 36 is fed to flip-flop 40. With the J and K inputs of flip-flop 40 set to the positive output voltage level of comparator 36, e.g. +5 volts, and the S and R inputs of the flip-flop set to zero volts, the rising edge of the output signal of comparator 36 can invert the signals at the outputs (Q and $\overline{Q}$) of flip-flop 40.

The outputs of flip-flop 40 would be suitable to provide control signals A and B only if a dwell period is not desired. In order to generate a dwell period, a dwell pulse is generated in pulse generating means 42 with a duration equal to the desired dwell period. Typical values are 50 pF for capacitor 43 and 100K ohms for resistor 44, giving a dwell period of about 5 microseconds. Diode 45 blanks out the negative pulse produced when comparator 36 goes low. Inverting means 50 inverts the dwell pulse produced across resistor 44. The dwell pulse turns on transistor 51, thereby providing a low input to each AND gate 56 and 57 and causing the output signals of AND gates 56 and 57 to go low. When the dwell pulse is absent, transistor 51 is nonconductive and resistor 53 provides a current path between the DC bus and logic means 55 comprising two AND gates. Thus, the inverted dwell pulse is ANDed with the Q and $\overline{Q}$ output signals of flip-flop 40, producing control signals A and B with the desired dwell period. Alternatively, a one-shot multi-vibrator could be used instead of pulse generating means 42 and inverting means 50 to produce the dwell pulse and/or the inverted dwell pulse.

Further circuitry is shown in FIG. 2 for ensuring that control signals A and B are prevented from switching during a starting condition (i.e. when there is no arc current in arc lamp 10). Signal C from current sensor 24 (FIG. 1) is supplied to the base of transistor 61 through resistor 62. In the absence of sufficient current to turn on transistor 61, input S is high and flip-flop 40 is held in a single (set) state by current flowing through resistor 60. When signal C is large enough, input S will be coupled to ground through transistor 61 and flip-flop 40 will be allowed to toggle. During the time that input S is high, current through resistors 60 and 64 turns on transistor 63, thus blanking out the dwell pulse during the starting condition.

Figure 3:
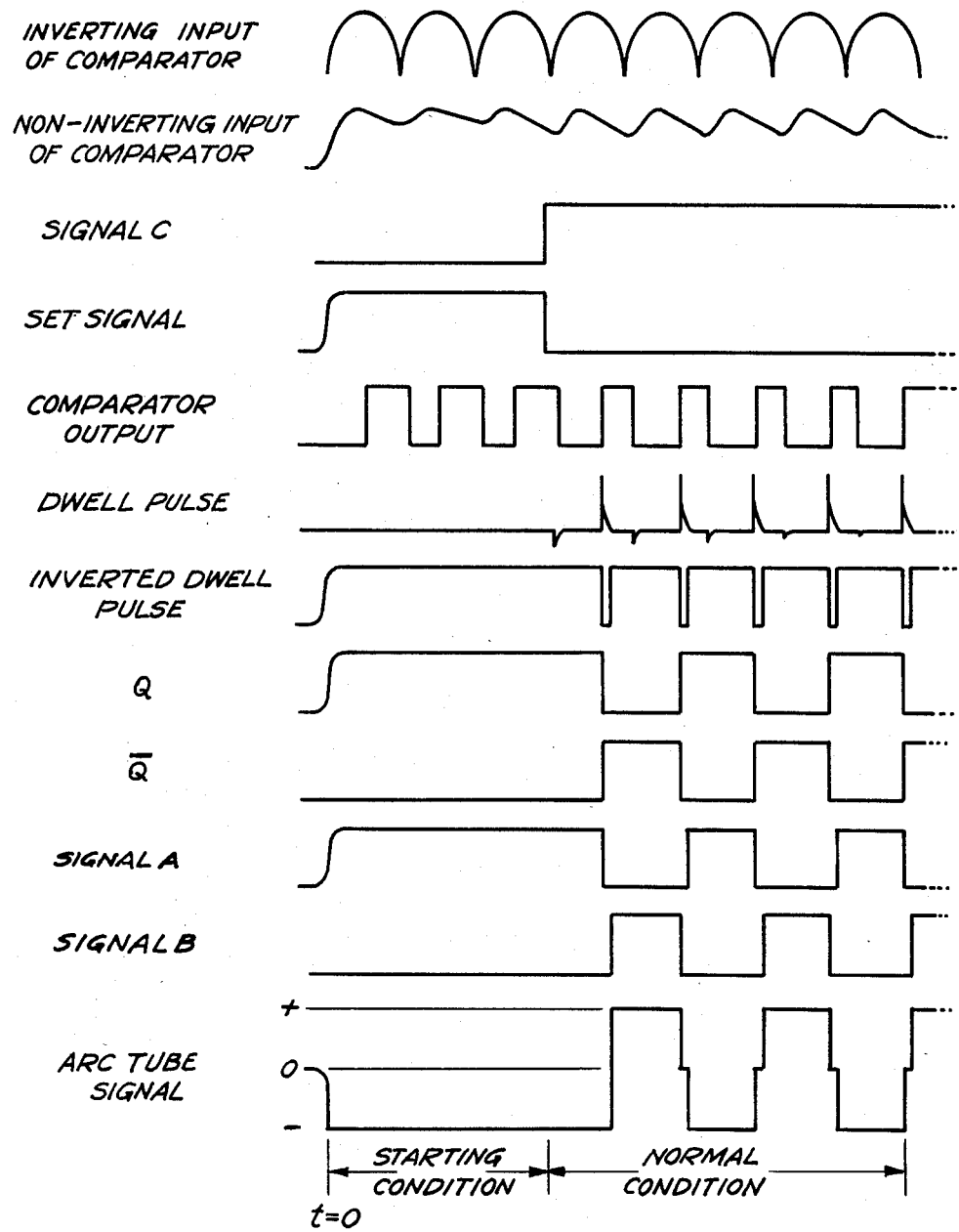
FIG. 3 is a timing diagram showing various signals generated in the circuit of FIG. 2.

A timing diagram illustrating the operation of the circuit of FIG. 2 is given in FIG. 3. A starting condition is shown beginning at t=0 and a normal condition begins at the end of the starting condition. During the starting condition, the set signal to flip-flop 40 is high so that output Q and control signal A are high and output $\overline{Q}$ and control signal B are low. The dwell pulse is blanked out during the starting condition. When the lamp enters its normal running condition, control signals A and B are toggled during each high comparator output pulse.

The foregoing has demonstrated a method and apparatus for switching an AC to AC full-bridge converter synchronously with the AC supply. Switching occurs when the rectifier diodes are off, which is conicident with the time when the voltage across the converter is at its maximum. Thus, reignition voltage is maximized and EMI conducted to the AC supply line is minimized.

While preferred embodiments of the present invention have been shown and decribed herein, it will be obvious that such embodiments are provided by way of example only. Numerous variations, changes and substitutions will occur to those skilled in the art without departing from the invention herein. Accordingly, it is intended that the invention be limited only by the spirit and scope of the appended claims.

What is claimed is:

1. A method for controlling the switches of an AC to AC converter synchronously with an AC supply, said converter including a diode rectifier and a plurality of switches coupled to said rectifier in a manner to supply power to a load, said method comprising the steps of:
   determining when the diodes in said diode rectifier are off; and
   turning said switches on and off so as to supply AC power to said load, the conducting states of said switches being changed upon determining that said diodes are off.

2. The method of claim 1 further including the step of opening all of said switches for a dwell period prior to changing the conducting states of said switches.

3. The method of claim 1 further including the steps of:
   detecting current flowing in said load; and
   locking said switches in one phase whenever the detected current is below a predetermined magnitude.

4. An apparatus adapted to provide control signals to the driver circuits of an AC to AC converter which are synchronized with the AC supply voltage, said converter including a diode rectifier, a filter capacitor connected across said rectifier and a plurality of switches coupled to said rectifier and arranged to supply AC power to a load, said apparatus comprising:
   a comparator having a noninverting input coupled to the output of said rectifier and having an inverting input coupled to the input of said rectifier; and
   a flip-flop having an input coupled to the output of said comparator such that the outputs of said flip-flop are inverted when said comparator output indicates that the diodes in said rectifier have turned off.

5. The apparatus of claim 4 further comprising:
   pulse generating means coupled to said output of said comparator for generating a dwell pulse, said pulse beginning when said comparator output indicates that said diodes are off and having a duration equal to a desired dwell period;
   inverting means coupled to said pulse generating means for providing a low logic level output during said dwell pulse and a high logic level output otherwise; and
   logic means coupled to the outputs of said flip-flop and to said inverting means for generating said control signals, said control signals being equal to said flip-flop output signals when the output signal of said inverting means is high and said control signals both having a low logic level otherwise the outputs of said logic means being adapted to be coupled to said plurality of switches.

6. The apparatus of claim 5 including at least two driver circuits coupling said logic means to said plurality of switches.

7. The apparatus of claim 4 further comprising:
   current sensing means coupled to said plurality of switches for sensing the current flowing in said load;
   setting means coupling said rectifier to said flip-flop for providing a set signal to set said flip-flop; and
   a controllable switch coupled to said current sensing means and said setting means for terminating said set signal when said sensed current exceeds a predetermined magnitude.

8. The apparatus of claim 5 further comprising:
   current sensing means coupled to said plurality of switches for sensing the current flowing in said load;
   setting means coupling said rectifier to said flip-flop for providing a set signal to set said flip-flop;
   a first controllable switch coupled to said current sensing means and said setting means for terminating said set signal when said sensed current exceeds a predetermined magnitude; and
   a second controllable switch coupled to said first controllable switch and to said pulse generating means for inhibiting said dwell pulse when said sensed current is below said predetermined magnitude.

9. A lighting system adapted to be connected to an AC supply, comprising:
   a diode rectifier for connecting to said AC supply;
   a capacitor coupled across the output of said rectifier;
   four switches arranged as a full-bridge coupled across said capacitor for supplying alternating current at the output of said full-bridge;
   an arc discharge lamp coupled across said full-bridge output;
   a resistive element connected in series between said capacitor and said full-bridge;
   four driver circuits each coupled to a respective one of said four switches;
   a comparator having a noninverting input coupled to the outputs of said rectifier and having an inverting input coupled to the inputs of said rectifier; and
   a flip-flop having an input coupled to the output of said comparator such that the outputs of said flip-flop are inverted when said comparator output indicates that the diodes in said rectifier have turned off, each of said flip-flop outputs being coupled, respectively, to two of said driver circuits.

10. The lighting system of claim 9 further comprising:
    pulse generating means coupled to said output of said comparator for generating a dwell pulse, said pulse beginning when said comparator output indicates that said diodes are off and having a predetermined duration equal to a desired dwell period;
    inverting means coupled to said pulse generating means for providing a low logic level output during said dwell pulse and a high logic level output otherwise;
    logic means coupled to the outputs of said flip-flop and to said inverting means for generating said control signals, said control signals being equal to said flip-flop output signals when the output of said inverting means is high and said control signals both having a low logic level otherwise, the outputs of said logic means being coupled to said driver circuits;

current sensing means coupled to said full-bridge for sensing the current in said arc lamp;

setting means coupling said rectifier to said flip-flop for providing a set signal to set said flip-flop;

a first controllable switch coupled to said current sensing means and said setting means for terminating said set signal when said sensed current exceeds a predetermined magnitude; and a second controllable switch coupled to said first controllable switch and to said pulse generating means for inhibiting said dwell pulse when said sensed current is below said predetermined magnitude.

* * * * *